Jan. 22, 1929.

R. H. STONE 1,699,721

MEANS FOR CUTTING DIES

Filed Feb. 19, 1927

INVENTOR.
R. H. Stone
BY
Thomas Howe ATTORNEY

Patented Jan. 22, 1929.

1,699,721

UNITED STATES PATENT OFFICE.

R. HARRY STONE, OF IRVINGTON, NEW JERSEY, ASSIGNOR TO TITEFLEX METAL HOSE CO., A CORPORATION OF NEW JERSEY.

MEANS FOR CUTTING DIES.

Application filed February 19, 1927. Serial No. 169,450.

My invention relates to apparatus for forming dies and has for an object to provide die cutting means adapted especially for use on an ordinary lathe.

A specific object of my invention is to provide means for cutting certain dies used in metal hose manufacture, which dies, heretofore, have had to be made by hand at considerable expense.

In my co-pending application, Serial No. 169,449 filed on even date herewith, I describe a machine for making certain intricate dies used in metal hose manufacture. The present invention is specifically adapted for forming dies of a simpler form, and whereas these simpler dies could be made in the machine described in said co-pending application, they do not call for the complicated movements provided in said machine, and hence an object of the present invention is to provide a simple lathe attachment which will permit of cutting the dies on an ordinary lathe.

Another object of my invention is to provide a lathe attachment which will rotate a die-blank and at the same time move the blank toward and from a lathe tool in timed relation to the rotation of the blank.

A further object of the invention is to provide a die-cutting attachment in which no springs are employed and in which movement of the die toward and from the tool is positively controlled.

While a specific object of my invention is to form certain dies used in hose manufacture, my invention is not limited to cutting any specific form of die, nor to the cutting of dies alone; for it will be evident that my die-cutting attachment could be used for cutting or forming a wide variety of articles and the cutting may be widely varied as to form and dimensions. Furthermore, my die-cutting attachment is not limited to use with a lathe, but could be applied to other machine tools having a rotary spindle and a slide rest supporting a cutting tool.

With the above named objects in view and other objects which will appear hereinafter, I shall now describe an embodiment of my invention and point out the novelty and scope of my invention in the appended claims.

In the accompanying drawings.

Figure 1:
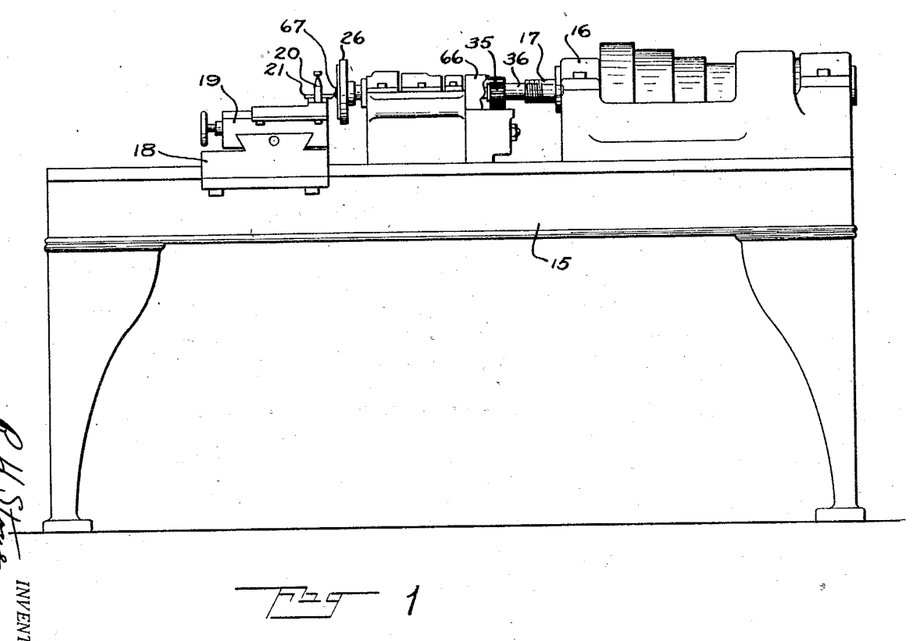
Figure 1 is a side view of a lathe fitted with my improved die-cutting attachment.

In Figure 1 I have shown a power-driven lathe of common type, comprising a bed 15, headstock 16, live spindle 17, tool carriage 18, slide rest 19, and tool post 20 in which is fitted a cutting tool 21. Mounted on the lathe bed 15 between the headstock and the tool carriage is my die-cutting attachment.

Figure 2:
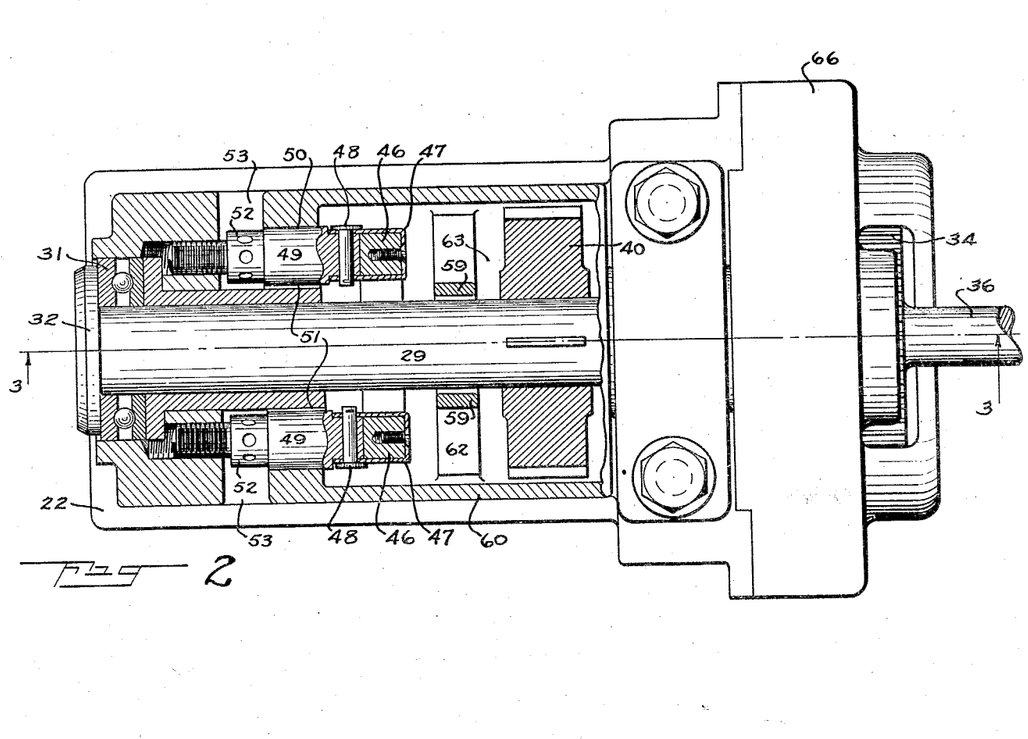
Fig. 2 is a plan view of my die-cutting attachment, partly broken away to illustrate certain details.
Figure 3:
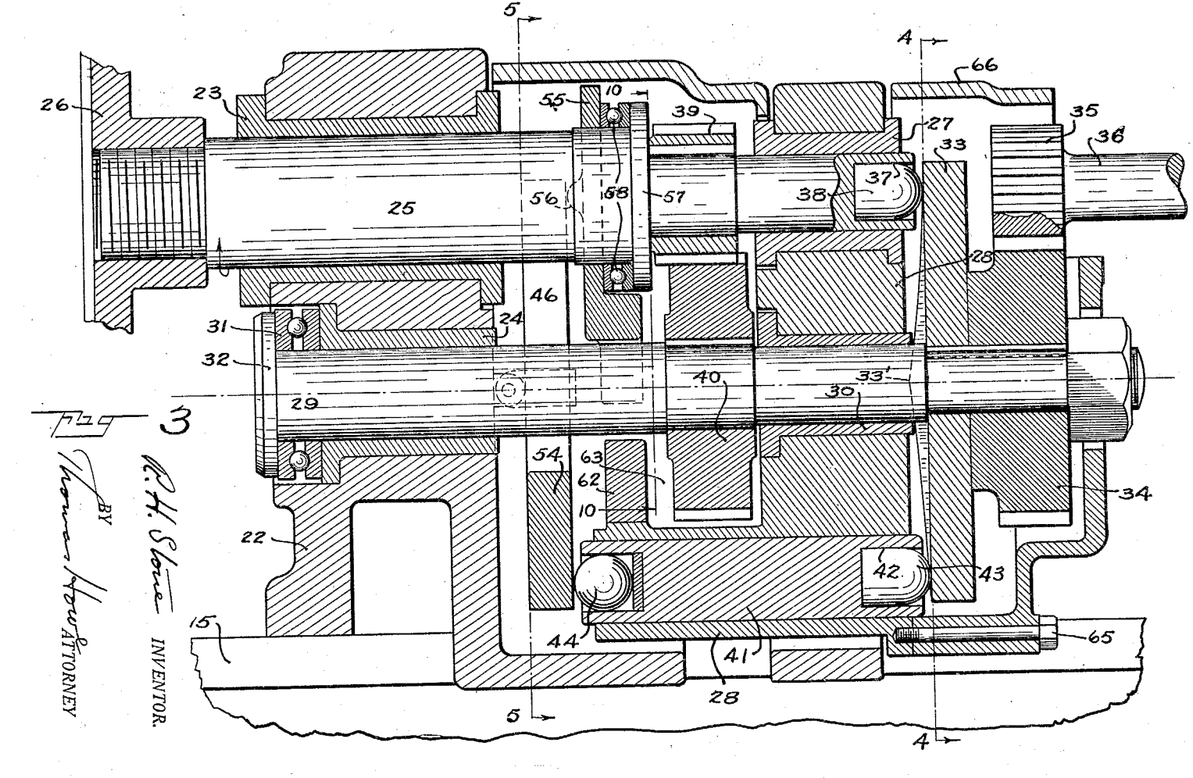
Fig. 3 is a view in section of my die-cutting attachment, the section being taken on the line 3—3 of Fig. 2.

As best shown in Figs. 2 and 3, my die-cutting attachment includes a bracket 22, which is supported on and locked to the bed of the lathe. This bracket provides an upper bearing 23 and a lower bearing 24. Mounted in the upper bearing is a shaft 25 which on the end adjacent the tool carriage, is provided with a face-plate 26 screwed thereon. The opposite end of the shaft 25 is mounted in a bearing 27 carried by a bracket 28. This bracket is supported on an extension of the bracket 22, as shown in the cross-sectional view Fig. 5. Mounted in the lower bearing 24 is a cam shaft 29 which also passes through the bracket 28 and is supported by a bearing 30 in said bracket. At the left-hand end of the shaft 29, as viewed in Fig. 3, there is a thrust bearing 31 which bears against a collar 32 carried by the shaft. Keyed to the opposite end of the shaft 29 are a face cam 33 and a spur gear 34. The latter meshes with a pinion 35 formed on a stub shaft 36 which is wedged into or otherwise secured to the hollow live spindle 17. At the right-hand end of the shaft 25, as viewed in the drawings, there is a recess 37 into which is fitted a plug 38. The latter is provided with a rounded projecting end which bears against the cam face of the cam 33.

Figure 9:
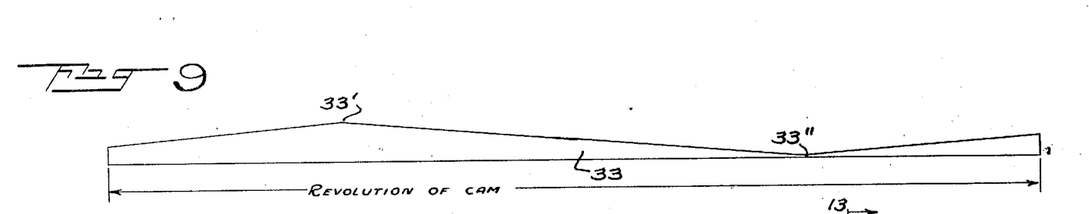
Fig. 9 is a development of a cam used in my die-cutting attachment.

Keyed to the shaft 25 intermediate between the bearings 23 and 27 is a mutilated or intermittent spur pinion 39 which is adapted to mesh with a mutilated or intermittent spur gear 40 keyed to the cam shaft 29. Thus as the cam shaft is rotated by the spindle 17, the shaft 25 is intermittently rotated by reason of the mutilated gear connection between the two shafts. At the same time, by reason of the engagement of the plug 38 with the cam 33, the shaft 25 will be moved axially in its bearings. Instead of holding the plug and the shaft 25 in operative engagement with the cam 33 by means of a spring, I provide mechanism which will insure positive engagement and return of the shaft 25. This mechanism will now be described:

The bracket 28 near the base thereof, is bored to receive a short rod 41, which at one end is provided with a recess 42 to receive a plug 43. This plug is provided with a rounded projecting end adapted to engage the cam 33 at a point diametrically opposite the point of engagement of the plug 38 therewith. The form of the cam 33 is shown in the development, Fig. 9, and will be seen to comprise a pair of oppositely pitched spiral faces which meet in a peak at a point 33' and in a node at a point 33'' diametrically opposite the peak. Thus when the cam is rotated, if the plugs are held in contact therewith, one of the plugs will be moving to the right, while the other is moving to the left and vice-versa.

Figures 4, 5:
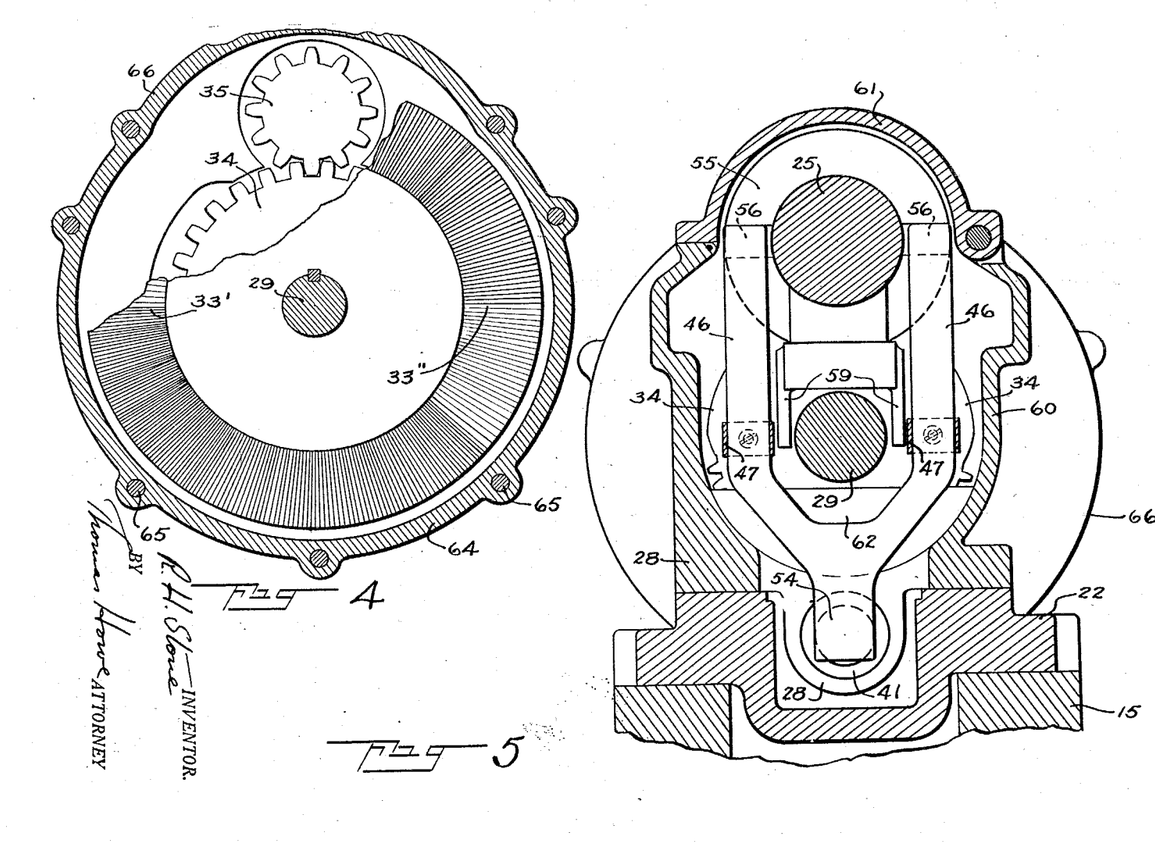
Fig. 4 is a view in section taken on the line 4—4 of Fig. 3.
Fig. 5 is a view in section taken on the line 5—5 of Fig. 3.

The purpose of the plug 43, is to cause the return of the shaft 25 after it has been pushed outwardly (or to the left, as viewed in the drawings,) by engagement of the plug 37 with the cam. To this end the left-hand end of the rod is fitted with a ball 44 which is adapted to bear against one arm of a lever, the other arm of which bears against the shaft 25. This lever is of the form of a yoke, as shown in Fig. 5, comprising a pair of arms 46 which straddle the shaft 25. The arms are fulcrumed to the bracket 22 by means of straps 47 secured to the arms respectively. The straps are hinged by means of transverse pins 48 to a pair of plugs 49 carried by the bracket 22. As shown in Fig. 2, the bracket 22 is formed with holes 50 in which the plugs 49 are adapted to slide and the plugs are kept from turning by means of splines 51. The plugs are adjusted in the holes 50 by means of set screws 52 threaded into the bracket 22 and providing abutments against which the inner ends of the plugs are respectively seated. The bracket 22 is formed with a transverse slot 53 to provide access to the set screws 52, so that the set screws may be turned to provide the proper adjustment for the plugs 49. Below the straps 47 the arms 46 unite in a common stem 54, which bears against the ball 44. Mounted on the shaft 25 and free to turn thereon, is a collar 55 provided with lugs 56 which bear against the upper ends of the arms 46. Between the collar 55 and a flange 57 formed on the shaft 25 is a thrust bearing 58. The collar 55 is provided with a pair of depending arms 59 which straddle the cam shaft 29 and thereby prevent the collar 55 from turning with the shaft 25.

The bracket 28 is extended to the left, as viewed in Fig. 3, to provide a housing 60 (Fig. 5) for the mechanism mounted between the brackets 28 and 22. This housing is provided with a hinged cover 61 by which access may be had to said mechanism. Running transversely across the housing below the shaft 29, is a wall or dam 62, which serves to form an oil pocket 63 for the gear 40 to turn in. At the right-hand end of the attachment is a housing 64 attached to the bracket 28 by means of bolts 65 and within the housing 64 are the cam 33, gear 34 and pinion 35.

Figure 10:
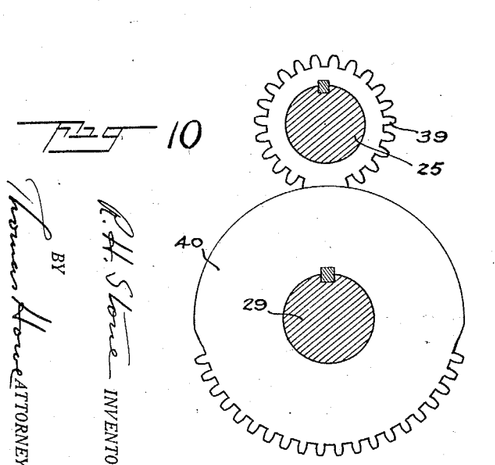
Fig. 10 is a fragmentary view in section taken on the line 10—10 of Fig. 3, showing a pair of mutilated gears used in my die-cutting attachment.

The operation of my die-cutting attachment will now be apparent. As the cam 33 is revolved by the spindle 17, the shaft 25 will be reciprocated, being moved to the left, as viewed in Fig. 3, by engagement of the plug 37 with the outwardly advancing surface of the cam. At the same time the plug 43 is engaging the inwardly receding surface being kept in engagement therewith by the lever whose arms 54 is being swung inward. After the plug 37 has passed the peak of the cam, the plug 43 will be moved outward by the outwardly advancing cam surface and acting through the lever will force the shaft inward or away from the lathe tool. In the meantime as the cam shaft is rotating, the shaft 25 will be intermittently turned by reason of the mutilated gears 39 and 40. Because these gears are spur gears, the pinion 39 is free to slide with respect to the gear 40 while in mesh therewith. By referring to Fig. 10 it will be observed that the pinion 39 makes a complete turn while engaged by the tooth portion of the gear 40. In other words, the pinion 39 makes one complete turn while the gear 40 is making half a turn, and then remains stationary during the other half turn of the gear 40. The purpose of this will appear later. The configuration of the cam 33 is so related to the gear 40 that the shaft 25 will be advanced outwardly (to the left, as shown in Fig. 3) while it is being rotated, and will return while the mutilated portion of the gear 40 is holding the pinion 39 against turning.

Figure 11:
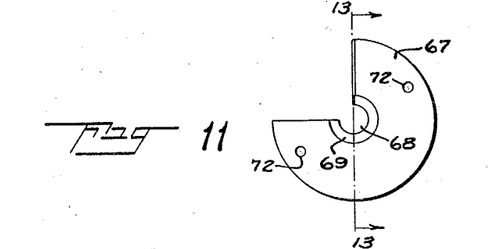
Fig. 11 is a face view of a die cut on my die-cutting attachment.
Figure 12:
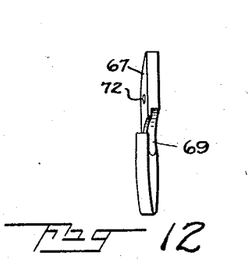
Fig. 12 is a side view of the die shown in Fig. 11.
Figure 13:
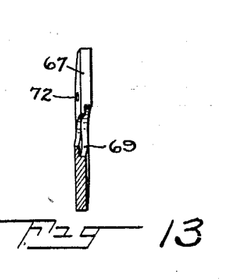
Fig. 13 is a view in section taken on the line 13—13 of Fig. 11.

The form of the particular dies which my die-cutting attachment is specifically designed to cut, is shown in Figs. 11 to 13. It will be seen that the die has the form of a spirally twisted disk 67 provided with a central opening 68 and with a segmental portion cut out of the disk. On the obverse side the central opening is counterbored and the face of the counterbore 69 is also spirally formed. The die is cut out of a thin disk of metal, centrally bored, and formed with a segmental notch therein. The first operation in cutting the die is to form the obverse face thereof. To this end the die-blank is secured to a plate 70 by means of bolts 71 which enter threaded openings 72 in the die-blank. There is a recess 74 in the face of the plate 70 in which the die-blank is seated and centered. The bolts 71 are inserted from the rear of the plate 70 so that they will not project and interfere with the cutting of the face of a die. The plate 70 is seated in a recess 26' in the faceplate 26 and is secured to the face-plate by means of bolts 73. The recess serves to center the die-blank with respect to the axis of the shaft and the bolts 73 to fix the angular position of the die with respect to the cam 33.

Figures 6, 7, 8:
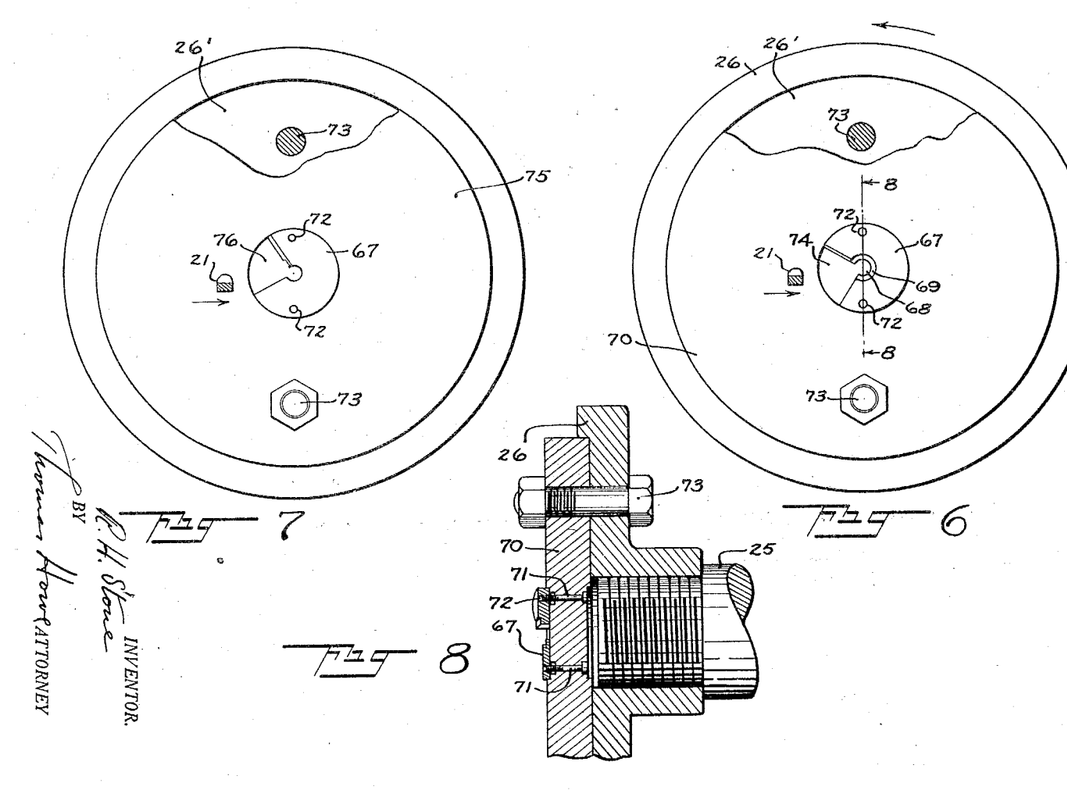
Fig. 6 is a view of a face plate used on my die-cutting attachment, showing a die-blank mounted thereon, the die having been faced and counterbored.
Fig. 7 is a view similar to Fig. 6, with the die reversed so that the back of the die may be faced.
Fig. 8 is a view in section taken on the line 8—8 of Fig. 6, and enlarged to illustrate details of mounting the die on the face-plate.

In operation, then, as the die-blank is turned by the shaft 25 it is also advanced toward the tool 21 so that the latter cuts a spiral face on the blank. Owing to the intermittent rotation of the shaft 25, the die makes a complete rotation while it is being advanced toward the tool and then stops rotating while it is receding from the tool. The die is so positioned angularly with respect to the cam that segmental notch in the disk is presented to the tool while the disk is receding. During this receding motion the operator can feed the tool transversely (in the direction of the arrow, Fig. 6) to make a fresh cut. Thus the work proceeds until the entire surface of the blank has been faced off on a spiral whose pitch is controlled by the cam 33. Thereafter, the counterbored portion of the die is cut. Then the plate 70 is removed and the die-blank unbolted therefrom. Another plate 75 is used to hold the die-blank while the reverse side thereof is being faced. The plate 75 is in every respect similar to the plate 70 except that it is provided with a spirally-faced seat 76 against which the spiral obverse face of the blank is seated. The blank is secured to the plate 75 in the seat 76 by means of the bolts 71 and is then fitted upon the plate 26 and secured thereto by means of the bolts 73. Instead of having a separate plate the plate 70 having a flat on one side and spiral on other and plate turned after cutting one side. Thereafter, the cutting operation is again repeated and the reverse side of the blank is spirally faced under control of cam 33, thus completing the cutting of the die.

Having thus described my invention and with the understanding that I am not limited to the precise details of the particular embodiment of my invention described and illustrated, but am at liberty to make such variations, alterations and modifications as fall within the spirit and scope of my invention, I claim:

1. In a machine of the character described, a work holder, means for causing linear reciprocation thereof, means for causing angular movement of the holder during one stroke of each reciprocation, and means for interrupting angular movement on the holder during the other stroke of each reciprocation.

2. In a machine of the character described, a work holder, means for rotating the holder, means for interrupting rotation of the holder at the end of each rotation thereof, and means for advancing the holder axially during each rotation thereof and withdrawing the holder axially while the rotation is interrupted.

3. An attachment for a lathe, comprising a work holder, a cam, means for rotating the holder and the cam, means cooperating with the cam operating during a part of each rotation thereof to advance the holder axially, and other means cooperating with the cam during another part of the rotation thereof to return the holder axially.

4. An attachment for a lathe, comprising a work holder, a cam, means for rotating the cam continuously and the holder intermittently, and means co-acting with the cam for positively advancing the holder during rotation of the holder and positively returning the holder while the rotation thereof is interrupted.

5. An attachment for a lathe, comprising a work holder, a cam, means for rotating the cam, means for causing a complete rotation of the holder during part of a rotation of a cam and interrupting rotation of the holder during another part of said rotation of the cam, and means co-acting with the cam for advancing the holder axially during rotation of the holder and retracting the holder axially while the rotation thereof is interrupted.

6. An attachment for a lathe, comprising a work holder, a cam, means for rotating the cam, means for causing a complete rotation of the holder during half a rotation of the cam and interrupting rotation of the holder during the other half of said rotation of the cam, and means co-acting with the cam for advancing the holder axially during rotation of the holder and retracting the holder axially while rotation thereof is interrupted.

7. An attachment for a lathe having a live spindle and a cutting tool, said attachment comprising a drive shaft adapted to be connected to the spindle, a cam rotated by the shaft, a work holder, means associated with the drive shaft for intermittently rotating the work holder, and means co-acting with the cam for advancing the holder toward the tool during rotation of the holder and retracting the holder while the rotation thereof is interrupted.

8. An attachment for a lathe having a live spindle and a cutting tool, said attachment comprising a drive shaft adapted to be attached to the spindle, a cam rotated by the shaft, a work holder, means associated with the shaft for intermittently driving the work holder, means co-acting with the cam for advancing the holder toward the tool during rotation of the holder, and a lever cooperating with the cam to retract the holder while the rotation of the holder is interrupted.

9. An attachment for a lathe having a live spindle and a cutting tool, said attachment comprising a main shaft, means for operatively connecting the main shaft to the spindle, a cam fixed upon the shaft, a work holder adapted to be moved by the cam toward and from the tool, and mutilated gearing connecting the work holder and the shaft to rotate the holder during movement toward the tool and keep the holder from rotating during movement away from the tool.

10. An attachment for a lathe having a live spindle and a cutting tool, said attachment comprising a main shaft, means for operatively connecting the main shaft to the spindle, a cam fixed upon the shaft, a work holder adapted to be moved by the cam toward and from the tool, and multilated gearing connecting the work holder and the shaft, said gearing causing the holder to make a complete rotation during movement thereof toward the tool and keeping the holder from rotating during movement away from the tool.

11. An attachment for a lathe having a live spindle, said attachment comprising a main shaft, means for operatively connecting the main shaft to the spindle, a face cam fixed upon the main shaft, the contour of one-half of the cam face being reversed with respect to the contour of the other half of the cam face, a driven shaft geared to the main shaft, said driven shaft having a work holder at one end thereof and engaging the cam at the other end, and a lever having one arm engaging the driven shaft and the other arm operatively connected with the cam at a point diametrically opposite the point where the driven shaft engages the cam.

12. An attachment for a lathe having a live spindle, said attachment comprising a main shaft, means for operatively connecting the main shaft to the spindle, a face cam fixed upon the main shaft, the face of said cam comprising two opposite inclines meeting in a peak at one point and in a node at a diametrically opposite point, a driven shaft having a work holder at one end thereof and engaging the cam at the other end, a lever on one side of the fulcrum thereof enagaging the driven shaft and on the other side being operatively connected with the cam at a point diametrically opposite the point where the driven shaft engages the cam, and mutilated gearing connecting the driven shaft with the main shaft, said gearing being timed to cause a complete rotation of the driven shaft while the point of engagement of the latter with the cam moves from the node to the peak and to hold the driven shaft against turning as the point of engagement of the latter with the cam moves from the peak to the node.

13. An attachment for a lathe having a live spindle and a cutting tool, said attachment comprising a main shaft, means for operatively connecting the main shaft to the spindle, a face cam fixed upon the main shaft, a drive shaft, a work holder at one end of the drive shaft, the other end of the drive shaft engaging the cam, a lever, said lever on one side of the fulcrum thereof engaging the driven shaft and on the other side being operatively connected with the cam at a point diametrically opposite the point where the driven shaft engages the cam, one-half of the cam operating against the shaft to advance the work holder toward the tool and thereafter operating against the lever to retract the work holder from the tool, and mutilated gearing connecting the driven shaft and the main shaft, said gearing being adapted to cause a complete rotation of the driven shaft while the work holder is advancing toward the tool and to keep the driven shaft from turning while the work holder is being retracted from the tool.

14. An attachment for a lathe having a live spindle and a cutting tool, said attachment comprising a main shaft, means for operatively connecting the main shaft to the spindle, a face cam fixed upon the main shaft, a drive shaft, a work holder at one end of the drive shaft, the other end of the drive shaft engaging the cam, a lever, a fulcrum shaft engaging the cam, a lever, a fulcrum therefor, means for adjusting the position of said fulcrum, said lever on one side of the fulcrum engaging the driven shaft and on the other side being connected with the cam at a point diametrically opposite the point where the driven shaft engages the cam, one-half of the cam operating against the shaft to advance the work holder toward the tool and thereafter operating against the lever to retract the work holder from the tool, and mutilated gearing connecting the driven shaft and the main shaft, said gearing being adapted to cause a complete rotation of the driven shaft while the work holder is advancing toward the tool and to keep the driven shaft from turning while the work holder is being retracted from the tool.

In testimony whereof I have signed this specification this 19th day of January, 1927.

R. HARRY STONE.